/ US 9,325,040 B2 /

(12) United States Patent
Takahashi et al.

(10) Patent No.: US 9,325,040 B2
(45) Date of Patent: Apr. 26, 2016

(54) ELECTRIC STORAGE APPARATUS INCLUDING BATTERY MODULES, FIRST COOLING PASSAGE, AND SECOND COOLING PASSAGE USED TO COOL BATTERY MODULE AFTER REPLACEMENT

(75) Inventors: Kou Takahashi, Tokyo (JP); Hidekazu Fujimura, Mito (JP); Tadashi Yoshida, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 248 days.

(21) Appl. No.: 13/818,108

(22) PCT Filed: Sep. 30, 2010

(86) PCT No.: PCT/JP2010/067100
§ 371 (c)(1),
(2), (4) Date: Feb. 21, 2013

(87) PCT Pub. No.: WO2012/042642
PCT Pub. Date: Apr. 5, 2012

(65) Prior Publication Data
US 2013/0177791 A1  Jul. 11, 2013

(51) Int. Cl.
*H01M 10/60* (2014.01)
*H01M 10/613* (2014.01)
*H01M 10/633* (2014.01)
(Continued)

(52) U.S. Cl.
CPC ...... *H01M 10/5004* (2013.01); *H01M 10/4207* (2013.01); *H01M 10/482* (2013.01); *H01M 10/486* (2013.01); *H01M 10/613* (2015.04); *H01M 10/617* (2015.04);
(Continued)

(58) Field of Classification Search
CPC .......... H01M 10/482; H01M 10/5004; H01M 10/5057; H01M 10/5022; H01M 10/4207; H01M 10/486; H01M 10/5008; H01M 10/5077; H01M 10/5071
USPC .................................................... 429/79, 120
See application file for complete search history.

(56) References Cited

U.S. PATENT DOCUMENTS 4,668,595 A * 5/1987 Yoshino et al. ............. 429/231.1
4,976,327 A * 12/1990 Abujudom et al. .......... 180/68.2
(Continued)

FOREIGN PATENT DOCUMENTS

JP  9-289042 A  11/1997
JP  11-75327 A  3/1999
(Continued)

OTHER PUBLICATIONS

Shimizu, H., Machine translation of JP 2009-009888 A, Jan. 2009.*
International Search Report including English translation dated Mar. 22, 2011 (Four (4) pages).

*Primary Examiner* — Sean P Cullen
(74) *Attorney, Agent, or Firm* — Crowell & Moring LLP

(57) ABSTRACT

An electrical storage apparatus 1 includes a plurality of battery modules 10 and cooling passages A, B for cooling each of the battery modules 10. The cooling passage A is configured so as to cool all battery modules 10 mounted in the electrical storage apparatus 1 at all times during charging. The cooling passage B is configured so as to cool only a new battery module 10a as a replacement during charging. This enables the battery module 10a having a temperature during charging higher than that of a battery module 10 yet to be replaced to be subject to forced cooling, thereby preventing performance of the battery module 10a from being degraded.

7 Claims, 11 Drawing Sheets

(51) Int. Cl.

| | | |
|---|---|---|
| *H01M 10/6561* | (2014.01) | |
| *H01M 10/6563* | (2014.01) | |
| *H01M 10/6567* | (2014.01) | |
| *H01M 10/48* | (2006.01) | |
| *H01M 10/42* | (2006.01) | |
| *H01M 10/6556* | (2014.01) | |
| *H01M 10/6568* | (2014.01) | |
| *H01M 10/617* | (2014.01) | |
| *H01M 10/6565* | (2014.01) | |

(52) U.S. Cl.
  CPC ....... *H01M 10/633* (2015.04); *H01M 10/6556* (2015.04); *H01M 10/6568* (2015.04); *H01M 10/6565* (2015.04)

(56) References Cited

U.S. PATENT DOCUMENTS

2006/0196954 A1    9/2006  Okuda et al.
2010/0300646 A1*  12/2010  Sawaguchi et al. ............. 165/51

FOREIGN PATENT DOCUMENTS

| JP | 2005-129359 A | 5/2005 |
| JP | 2005-183241 A | 7/2005 |
| JP | 2006-244829 A | 9/2006 |
| JP | 2009-9888 A | 1/2009 |
| JP | 2010-114989 A | 5/2010 |
| WO | WO 2009110352 A1 * | 9/2009 |

* cited by examiner

FIG.5

| BATTERY MODULE | COOLING PASSAGE A | COOLING PASSAGE B ||
|---|---|---|---|
| | | MODULE YET TO BE REPLACED | MODULE REPLACED |
| NORMAL COOLING | OPEN | CLOSED | CLOSED |
| FORCED COOLING | OPEN | CLOSED | OPEN |

FIG. 8
(A)
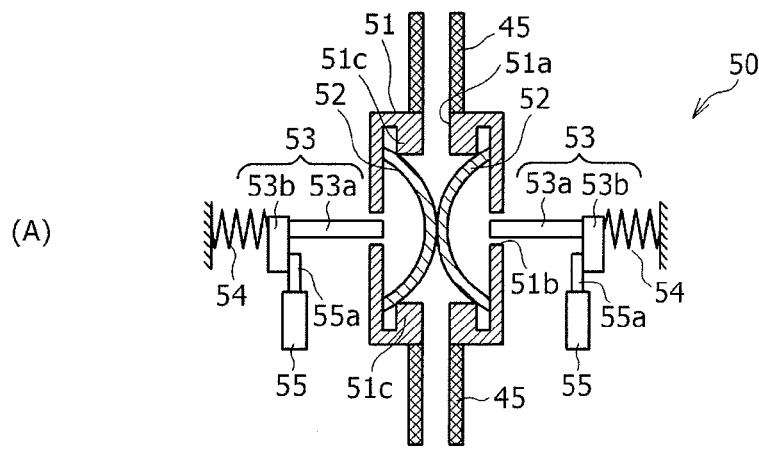
(B)
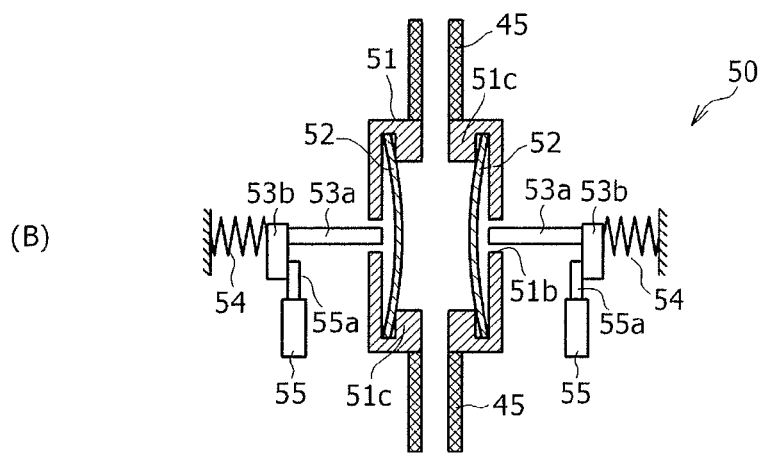
(C)
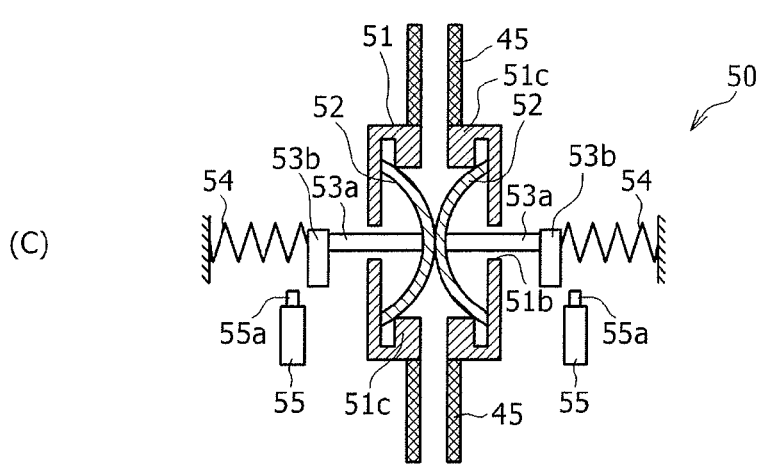

FIG.10

| BATTERY MODULE | COOLING PASSAGE A | COOLING PASSAGE B |
|---|---|---|
| NORMAL COOLING | OPEN | ---- |
| FORCED COOLING | OPEN | OPEN |

ELECTRIC STORAGE APPARATUS INCLUDING BATTERY MODULES, FIRST COOLING PASSAGE, AND SECOND COOLING PASSAGE USED TO COOL BATTERY MODULE AFTER REPLACEMENT

TECHNICAL FIELD

The present invention relates generally to electrical storage apparatuses and, more particularly, to an electrical storage apparatus requiring forced cooling.

BACKGROUND ART

Electrical storage apparatuses as power supplies used for vehicles or electricity storage include a plurality of secondary batteries that are discharged and recharged to put the electrical storage apparatuses in action. Such an electrical storage apparatus requires forced cooling, since the secondary batteries are charged or recharged by a large current, which causes the secondary batteries to generate heat to thereby increase temperature of the electrical storage apparatus.

The forced cooling is accomplished by using a fan or a pump that supplies gas or liquid coolant to a cooling passage that is in contact with a surface of each secondary battery.

A known electrical storage apparatus includes both gas cooling means and liquid cooling means to thereby allow either one of the following two conditions to be selected, one in which either one of the cooling means is operated and the other in which both cooling means are operated. The electrical storage apparatus is intended to minimize a difference in temperature among the secondary batteries as much as feasible by adjusting cooling effects of the secondary batteries that are varying according to a temperature difference of the operating environment and a specific position at which the cooling passage is disposed and to reduce power consumption (see, for example, Patent Document 1).

PRIOR ART DOCUMENT

Patent Document

Patent Document 1: JP-2009-009888-A

SUMMARY OF THE INVENTION

Problem to be Solved by the Invention

In the apparatus disclosed in Patent Document 1, no consideration is given to degradation of performance of a new secondary battery when an old secondary battery that has been used for a long time is replaced with the new one. Though a detailed description will be given later, a new secondary battery has a small internal resistance and a large charging current flows therethrough with a resultant increased amount of heat generated, so that temperature of the secondary battery rises to a high level. As a result, use of a newly replaced secondary battery in combination with an old one yet to be replaced with a new one accelerates degradation of performance.

Means for Solving the Problem

According to a first aspect of the present invention, an electrical storage apparatus comprises: a plurality of battery structures, each including at least one secondary battery element; a first cooling passage for cooling each of the battery structures; a second cooling passage for cooling at least one of the battery structures; and coolant supply means for supplying coolant to each of the battery structures via the first cooling passage and, within a predetermined period of time after replacement of the battery structure, supplying coolant to the battery structure via the second cooling passage.

According to a second aspect of the present invention, in the electrical storage apparatus as defined in claim 1, the coolant supply means includes: a temperature sensor for detecting a temperature of each battery structure; and battery replacement determining means for determining whether a battery structure is a replacement battery structure based on a change in temperature of the battery structure, the temperature of the battery structure being detected at predetermined time intervals.

According to a third aspect of the present invention, in the electrical storage apparatus as defined in claim 2, the battery replacement determining means includes: a storage unit for storing a temperature change characteristic of the replacement battery structure; calculating means for calculating a temperature change characteristic of each battery structure; and determining means for determining a replacement battery structure by comparing the temperature change characteristic stored in the storage unit with the temperature change characteristic calculated by the calculating means.

According to a fourth aspect of the present invention, in the electrical storage apparatus as defined in any one of claims 1 to 3, the coolant supply means includes: an open/close valve for opening or closing at least a flow passage of the second cooling passage; and control means for controlling opening and closing of the open/close valve.

According to a fifth aspect of the present invention, in the electrical storage apparatus as defined in any one of claims 1 to 4, the coolant supply means includes overcooling prevention means for closing the flow passage of the second cooling passage after the coolant supply means has supplied the battery structure with coolant via the second cooling passage for a predetermined period of time.

According to a sixth aspect of the present invention, in the electrical storage apparatus as defined in claim 1, the coolant supply means includes an open/close member formed of a shape memory alloy, the open/close member being deformed by the temperature of the battery structure to thereby open or close at least the flow passage of the second cooling passage.

According to a seventh aspect of the present invention, in the electrical storage apparatus as defined in claim 1, the electrical storage apparatus further comprises: disposition means for disposing therein all of the battery structures, wherein the battery structure to which the coolant is supplied via the second cooling passage is disposed at a predetermined position of the disposition means.

According to an eighth aspect of the present invention, in the electrical storage apparatus as defined in claim 6 or 7, the coolant supply means includes overcooling prevention means for closing the flow passage of the second cooling passage after the coolant supply means has supplied the battery structure with coolant via the second cooling passage for a predetermined period of time.

According to a ninth aspect of the present invention, in the electrical storage apparatus as defined in claim 1, the secondary battery element comprises a lithium-ion secondary battery cell.

Effect of the Invention

The present invention enables only the replacement battery structure to be cooled by the coolant supplied via the second cooling passage, thereby preventing performance of the replacement battery structure from being degraded.

BRIEF DESCRIPTION OF THE DRAWINGS

FIG. 5 is a table showing open/close positions of open/close valves of a cooling system shown in FIG. 1.

FIGS. 8(A), 8(B), and 8(C) are cross-sectional views for illustrating operation of a flow passage open/close mechanism shown in FIG. 7.

FIG. 10 is a table showing open/close positions of a flow passage open/close mechanism of a cooling system shown in FIG. 9.

MODES FOR CARRYING OUT THE INVENTION

First Embodiment

An electrical storage apparatus according to an embodiment of the present invention will be described in detail below with reference to the drawings.

Figure 1:
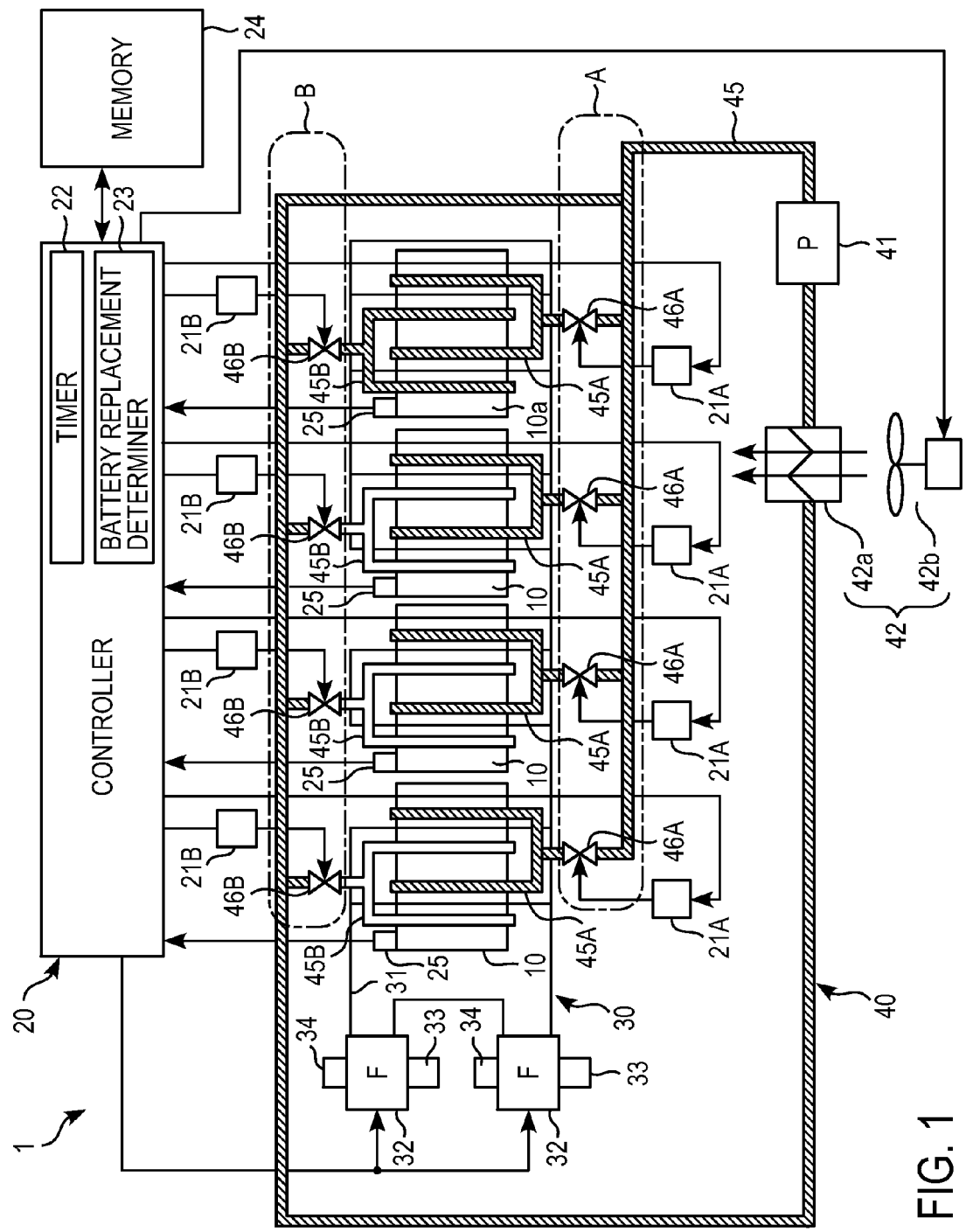
FIG. 1 is a configuration diagram showing a concept of an electrical storage apparatus according to a first embodiment of the present invention.

FIG. 1 is a configuration diagram showing a concept of an electrical storage apparatus 1 according to the embodiment of the present invention.

The electrical storage apparatus 1 includes a plurality of battery modules (battery structures) 10. Though FIG. 1 shows only four battery modules 10, the electrical storage apparatus 1 may include an even greater number of battery modules 10. The electrical storage apparatus 1 is mainly used for railroad vehicles or electricity storage, though not limited thereto. The electrical storage apparatus in this application can produce high power of electricity and is high-priced. To enable use over an extended period of time, therefore, the electrical storage apparatus has an old battery module 10 that has been used and is no longer good for use for its degraded performance replaced with a new battery module 10.

Though not shown, the electrical storage apparatus 1 is installed in a case, a container, or a battery chamber having a predetermined space. The battery modules 10 are arrayed in a single row in FIG. 1; however, the battery modules 10 may still be arrayed in a plurality of rows. The electrical storage apparatus 1 includes two different types of cooling systems, each circulating a unique type of coolant. A first cooling system is a gas cooling system 30 that supplies gas, such as the atmosphere, to each of the battery modules 10. The gas cooling system 30 includes a pipe 31 and two blower fans 32. Part of the pipe 31 is in contact with a surface of each battery module 10. The blower fans 32 each include an intake port 33 that draws the atmosphere and a discharge port 34 that discharges air having an increased temperature after heat exchange with the battery module 10.

A second cooling system is a liquid cooling system 40 using a liquid coolant. The liquid cooling system 40 includes a pump 41 that forcedly supplies each battery module 10 with the coolant and a radiator 42 that performs heat exchange with the battery module 10 to thereby radiate heat from a hot coolant. The radiator 42 includes a radiating fin 42a and a cooling fan 42b. The liquid cooling system 40 further includes a pipe 45 that branches into a cooling passage A and a cooling passage B. An open/close valve 46A for opening or closing the flow passage is disposed between the cooling passage A and each battery module 10. An open/close valve 46B for opening or closing the flow passage is disposed between the cooling passage B and each battery module 10. The open/close valves 46A, 46B can be opened or closed by a signal transmitted from a controller 20, to thereby adjust a flow rate of the coolant. Part of each of pipes 45A connected to the cooling passage A and part of each of pipes 45B connected to the cooling passage B are in contact with the surface of the battery module 10.

A temperature sensor 25 that detects the temperatures of the battery module 10 is mounted on each battery module 10.

A temperature detection value from each temperature sensor 25 is applied to the controller 20. The controller 20 stores the temperature detected by each temperature sensor 25 in memory 24 at a predetermined timing. The controller 20 controls the blower fan 32, the cooling fan 42b that constitutes the radiator 42, and the pump 41 to thereby rotate each at a desired speed or bring each to a stop. The controller 20 sends a command to an actuator 21A to thereby open each open/close valve 46A to a desired opening angle or close the same. Similarly, the controller 20 sends a command to an actuator 21B to thereby open each open/close valve 46B to a desired opening angle or close the same.

The controller 20 includes a timer 22 and a battery replacement determiner 23 that determines whether a battery module 10 is new. Although the battery replacement determiner 23 will be described in detail later, the battery replacement determiner 23 retains in advance temperature change information during charging or discharging for at least one of a new battery module 10 and a used battery module 10 having increased resistance. Then, the temperatures of each battery module at two different measurement timings are detected with the temperature sensor 25 during charging or discharging and the change in temperature is calculated through arithmetic operations. The change in temperature thus calculated is then compared with the temperature change information retained earlier, thereby the battery module 10 is to be determined to be new or not.

Figure 2:
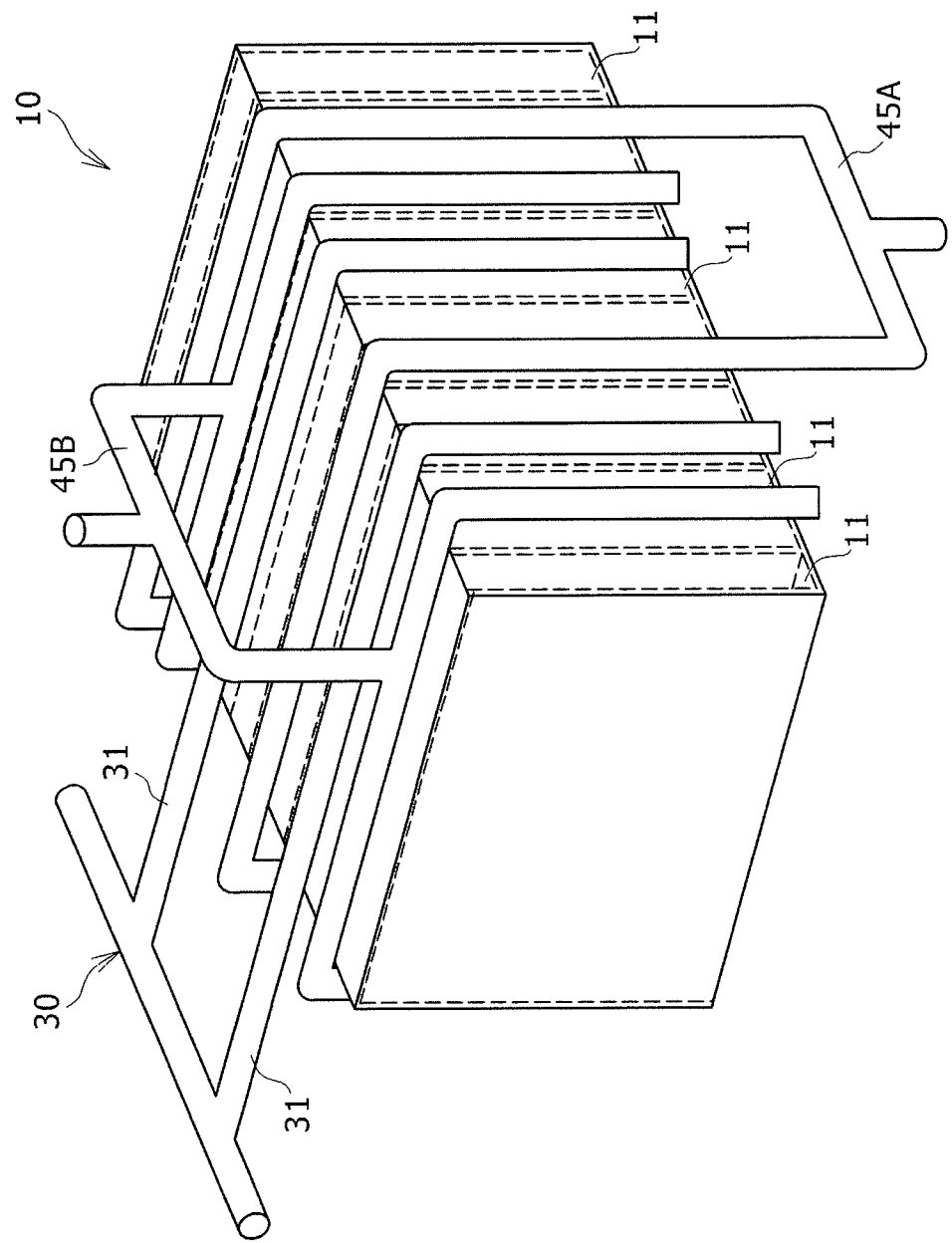
FIG. 2 is an enlarged perspective view for illustrating a cooling mechanism of an electrical storage structure shown in FIG. 1.

FIG. 2 is an enlarged perspective view showing one battery module 10 and the piping for cooling the battery module 10.

The battery module 10 includes a plurality of secondary battery elements 11 formed of, for example, lithium-ion secondary battery cells. The secondary battery elements 11 each are configured, though not shown, such that a positive electrode and a negative electrode are laminated with each other with a separator inserted therebetween to thereby form a flat-shaped electricity-generating element which, in turn, is housed in a container in which a nonaqueous electrolyte is poured. More specifically, the positive electrode is a positive electrode sheet having both surfaces coated with a positive electrode active material and the negative electrode is a negative electrode sheet having both surfaces coated with a negative electrode active material. The battery module 10 is a laminate laminating such secondary battery elements with each other or a winding body winding such secondary battery elements via a conductive sheet or an isolating sheet, housed in an outer container.

Part of the pipe 31 of the first cooling system 30 is in contact with the surface of the battery module 10. Additionally, part of each pipe 45A of the cooling passage A and part of each pipe 45B of the cooling passage B of the second cooling system 40 are in contact with the surface of the battery module 10. Consequently, as the coolant circulates through the piping, each battery module 10 exchange heat with the coolant, so that its temperature increased as a result of heat generation is reduced.

Figure 3:
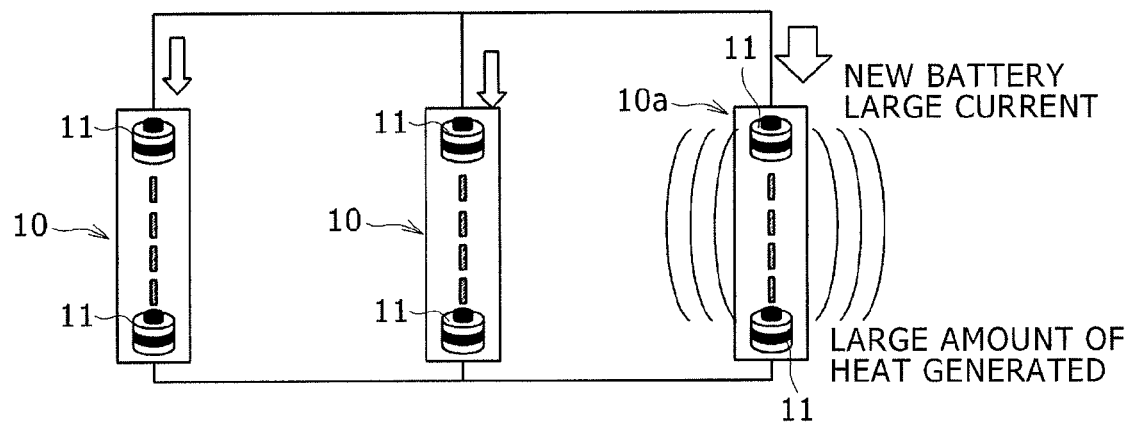
FIG. 3 is a diagram for illustrating an amount of heat generated by a battery structure when the battery structure is being charged.

FIG. 3 is a schematic diagram for illustrating that an amount of heat generated by a battery module with performance degraded as a result of a long time of use (hereinafter referred to as an "old battery module") differs from that generated by a new battery module while the battery structure is being charged. A difference in the amount of heat generated between the old battery module 10 and a new battery module 10a during charging will be described with reference to FIG. 3. An electrolyte and an internal conductive member of the old battery module 10 are deteriorated after a long time of use, resulting in an increased resistance value. In contrast, the new battery module 10a, which has been used very little, has a large battery capacity and thus a resistance value lower than that of the old battery module 10. Therefore, as shown in FIG. 3, performing constant current charging with these battery modules 10 connected in parallel causes an average charging current of the new battery module 10a having a small resistance value to become larger than that of the old battery module 10.

Let Q be the amount of heat generated by the battery module 10, I be the charging current, R be the internal resistance of the battery module 10, and t be current application time. Then, the relationship expressed by (expression 1) holds.

$$Q \propto I^2 R t \qquad \text{[Expression 1]}$$

Specifically, the amount of heat generated by the battery module 10 is proportional to the internal resistance R and increases with the square of the charging current. Therefore, if, after the old battery module 10 with degraded performance is replaced with the new battery module 10a, the new battery module 10a is subject to cooling with the same cooling effect as that of the old battery module 10, the new battery module 10a has a higher temperature than the old battery module 10 does, resulting in accelerated degradation of performance of the new battery module 10a.

Figure 4:
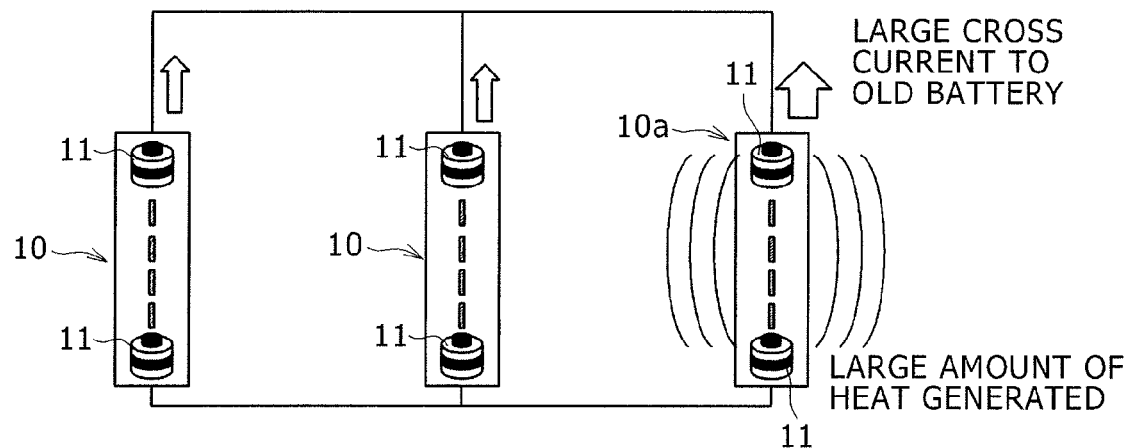
FIG. 4 is a diagram for illustrating cross current occurring between battery modules of the electrical storage apparatus after charging of the battery structure is completed.

FIG. 4 is a diagram for illustrating cross current that occurs between the battery modules 10 of the electrical storage apparatus after the charging of the battery modules 10 is completed.

The new battery module 10a has an increased voltage after charging. In a condition in which the electrical storage apparatus 1 is not in use, specifically, in which the electrical storage apparatus 1 is in storage, cross current occurs to flow from the new battery module 10a to the old battery module 10. The cross current therefore contributes also to an increased temperature of the new battery module 10a. The even higher temperature of the new battery module 10a accelerates deterioration of the new battery module 10a. The electrical storage apparatus 1 in this embodiment is thus configured such that, when an old battery module 10 replaced due to deterioration is replaced with a new battery module 10a, cooling of the new battery module 10a is greater than that of the old battery module 10.

Operation of the electrical storage apparatus 1 shown in FIG. 1 will be described below.

Referring to FIG. 1, assume that the battery module on the right end side is the new battery module 10a that has replaced an old battery module.

In a condition in which none of the battery modules 10 is replaced and all is being used in a deteriorated state substantially identical to each other, the controller 20 issues drive commands to the blower fans 32 of the first cooling system 30, so that the battery modules 10 each are cooled by cooling air blown through the pipe 31 by the blower fans 32 at all times.

In addition, the controller 20 issues commands to the actuators 21A to open to a desired angle all of the open/close valves 46A connected to the cooling passage A of the second cooling system 40. This causes coolant delivered from the pump 41 to be supplied to the battery modules 10 via the respective open/close valves 46A, so that the battery modules 10 each are cooled by the coolant.

In addition, the controller 20 issues commands to the actuators 21B to close all of the open/close valves 46B connected to the cooling passage B of the second cooling system 40. Thus, the coolant delivered form the pump 41 does not pass through the open/close valves 46B, so that the battery modules 10 are not cooled by the coolant that circulates through the cooling passage B. Under the foregoing condition, a temperature detection value representing the temperature of each battery module 10 is being sent from the corresponding temperature sensor 25 to the controller 20. The controller 20 adjusts the opening of each open/close valve 46A based on the temperature detection value from each temperature sensor 25. The foregoing represents temperature control to be performed prior to replacement of the battery module 10.

Assume now that the battery module 10 on the right end is seriously deteriorated, no longer suitable for continued use, and thus replaced with a new battery module 10a to start constant current charging. Soon after the start of the charging, the controller 20 recognizes that the new battery module 10a has been installed in the electrical storage apparatus 1. This is because of the following reason. Specifically, as described earlier, the new battery module 10a has a temperature higher than that of the old battery module 10 during the charging, so that the controller 20 can determine that the battery module 10a is new based on the temperature detection value of each battery module 10 sent from the corresponding temperature sensor 25 to the controller 20.

Upon determining that the battery module 10a is new, the controller 20 issues a command to the actuator 21B to open the open/close valve 46B that is associated with the battery module 10a. At this time, the open/close valves 46B other than the open/close valve 46B associated with the battery module 10a are kept closed. This allows the coolant to be supplied to the battery module 10a from the cooling passage B of the second cooling system 40 via the open/close valve 46B. Specifically, the coolant that circulates through the pipe 31, the pipe 45A, and the pipe 45B is supplied only to the battery module 10a. The open/close valves 46A and 46B shown in FIG. 1 represent open/close positions under the abovementioned charging state. As such, cooling capacity relative to the battery module 10a is greater than that of the battery modules 10 that are yet to be replaced with new ones and are cooled by the coolant that circulates through the pipe 31 and the pipes 45A, so that the new battery module 10a can be prevented from being deteriorated sharply.

FIG. 5 is a table showing an open/close position of each of the open/close valves under normal cooling and forced cooling, tabulating the foregoing description. It is noted that the term "forced cooling", as used herein, refers to cooling performed when a new battery module 10a is installed to replace an old battery module 10.

As described earlier, charging control during replacement of the battery modules is performed with the electrical storage apparatus placed in a non-use state and, after the charging is completed, the electrical storage apparatus is brought back into a use state. After the completion of the charging, the new battery module 10a has a smaller internal resistance and thus generates a greater amount of heat than the battery module 10 yet to be replaced with a new one does. The cooling control to keep the cooling of the new battery module 10a greater than that of the battery module 10 yet to be replaced with a new one is therefore continued for a predetermined period of time after the replacement of the electrical storage modules. In a condition in which the electrical storage apparatus 1 is not in use, specifically, in which the electrical storage apparatus 1 is in storage, the cross current that flows from the new battery module 10a to the battery module 10 yet to be replaced with a new one causes the new battery module 10a to generate a greater amount of heat. Therefore, in the storage condition, too, the cooling of the new battery module 10a is made to be greater than that of the battery module 10 yet to be replaced with a new one. If the cooling of the electrical storage apparatus 1 in the storage state is too strong, an arrangement may be made to cool only the new battery module 10a. At this time, drive of the blower fan 32 is to be stopped and all of the open/close valves 46A are to be closed.

In the related-art cooling method, the new battery module 10a is cooled with intensity identical to that of the old battery module 10. In this method, the temperature of the new battery module 10a becomes higher than that of the old battery module 10, so that performance of the new battery module 10a is degraded seriously and thus quickly to a level comparable with that of the old battery module 10 within a short period of time.

Specifically, despite the replacement of the old battery module 10 with the new battery module 10a, the related-art cooling method has let the performance of the new battery module 10a be degraded to the level comparable with that of the old battery module 10 within a short period of time without allowing the new battery module 10a to exhibit its original service life.

In contrast, the electrical storage apparatus 1 according to this embodiment achieves an effect of sufficiently extending duration of the newly installed battery module 10a as a replacement.

Incidentally, an old battery module 10 after a long time of use has internal resistance that increases gradually so as to generate an amount of heat equivalent to that of a newly replaced battery module 10a.

Figure 6:
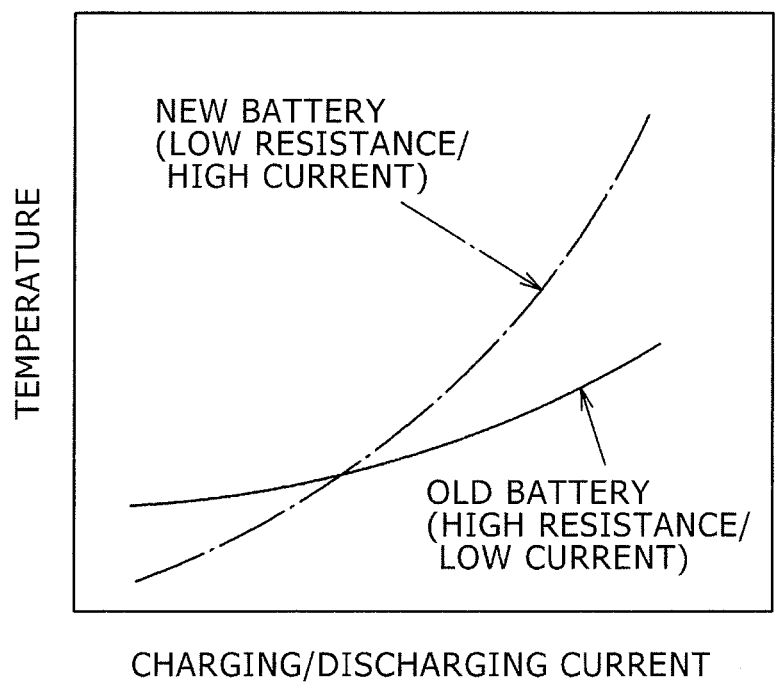
FIG. 6 is a graph for illustrating differences in temperature increase between new and old battery structures during charging.

FIG. 6 is a graph that compares a new battery module with an old battery module with charging/discharging current and temperature as parameters.

The replaced new battery module 10a has a resistance smaller than an average value of resistance of the battery modules 10 in the electrical storage apparatus 1, resulting in a current value during charging/discharging being greater than an average value of current values of the battery modules 10 in the electrical storage apparatus 1. Meanwhile, the deteriorated old battery module 10 has a resistance greater than the average value of resistance of the battery modules 10 in the electrical storage apparatus 1, resulting in a current value during charging/discharging being smaller than the average value of the current values of the battery modules 10 in the electrical storage apparatus 1.

As described earlier, the amount of heat Q generated by the battery is proportional to the resistance R and the square of the charging current I.

If the increase in resistance associated with deterioration falls within the bounds of common sense (a rate of increase in resistance for life determination or less), the amount of heat generated changes more with a battery module 10 having larger current values during charging or discharging. Specifically, the rate of increase in the amount of heat generated by the new battery module 10a is greater than that in the amount of heat generated by the old battery module 10. Using the foregoing, heat generation can be determined to be associated with an increase in resistance or in current. Specifically, the temperatures of the battery module 10 at two different timings are measured in a charged state or a discharged state and a comparison is made of changes in temperatures between the two timings.

In this embodiment, the controller 20 includes the battery replacement determiner 23 that determines whether a battery module is a new battery module 10a. The battery replacement determiner 23 retains in advance temperature change information of the new battery module 10a during charging or discharging. Then, the temperature sensor 25 is brought into play to detect the temperature of each battery module 10 at a specific timing during charging or discharging and the detected values are stored in the memory 24. In addition, the temperature sensor 25 is brought into play to detect the temperature of each battery module 10 at different timings during charging or discharging and the detected values are stored in the memory 24. Next, the battery replacement determiner 23 calculates a gradient of a change in temperature relative to a predetermined period of time of each battery module 10 through arithmetic operation. By comparing the calculated gradient of a change in temperature relative to the predetermined period of time of each battery module 10 with the temperature change information of the new battery module 10a retained previously, the battery replacement determiner 23 determines whether the battery module is a new battery module 10a. It is noted that the temperature change information is a rate of change with time or temperature information required for calculating the rate of change with time.

Cooling with intensity greater than that for the battery module 10 yet to be replaced with a new one, specifically, the forced cooling is performed only for the battery module that has been determined to be a new battery module 10a as described above. This prevents the force cooling from being performed for the old battery module 10. The battery replacement determiner 23 may also retain temperature change information of the old battery modules 10, in addition to the temperature change information of the new battery module 10a. The battery replacement determiner 23 may still retain a temperature history table at a large number of measurement points of the new battery module 10a or the old battery module 10, in addition to the temperature change information at two different timings. Results of detection of temperatures by the temperature sensor 25 may then be checked against the temperature history table to thereby determine whether a battery module is a new battery module 10a.

Performance of the battery module 10 is degraded, if the battery module 10 is cooled excessively. The new battery module 10a also has increased internal resistance through gradual deterioration with a resultant gradually decreasing amount of heat generated. Intensely cooling the new battery module 10a for a long time therefore accelerates degradation of performance.

In this embodiment, therefore, after forced cooling is performed for a predetermined period of time by opening the open/close valve 46B associated with the new battery module 10a, the controller 20 issues a command to the actuator 21B to thereby close the open/close valve 46B associated with the new battery module 10a. Thereafter, the replaced new battery module 10a is subject to normal cooling as with the battery module 10 yet to be replaced with a new one.

The embodiment described heretofore achieves the following effects.

(1) Only the new battery module 10a that has been newly installed to replace an old battery module 10 is subject to forced cooling with intensity greater than that for the battery module 10 yet to be replaced with a new one. The new battery module 10a can therefore be prevented from being deteriorated and performance of the battery module 10 yet to be replaced with a new one can be maintained.

(2) A difference in the rate of change in temperature between the new and old battery modules is particularly noted and a battery module is determined to be a new battery module 10a or not by calculating the change in temperature relative to a predetermined period of time of each battery module 10 during charging or discharging. This prevents the forced cooling from being performed even with an increase in temperature of the battery module 10 yet to be replaced with a new one and thus prevents performance of the battery module 10 yet to be replaced with a new one from being degraded.

(3) Normal cooling is resumed after forced cooling for a predetermined period of time of the new battery module 10a. This eliminates possibility of the new battery module 10a being excessively cooled, so that performance of the new battery module 10a is prevented from being degraded due to overcooling.

Though not specifically described, the temperature sensor 25 that detects the temperature of each of the battery modules 10 is mounted for each battery module 10. This enables cooling with an appropriate intensity by adjusting the opening of the open/close valve 46A based on the temperature detection value of each battery module 10.

In the embodiment described above, the electrical storage apparatus 1 includes the first cooling system 30, using gas coolant and the second cooling system 40 using liquid coolant. The electrical storage apparatus 1 may nonetheless include only either one of the cooling systems. Additionally, in the embodiment described above, the cooling passage A of the second cooling system 40 has the open/close valves 46A. The electrical storage apparatus 1 may nonetheless include no open/close valves 46A. In this case, intensity of cooling for the battery modules 10 may be adjusted by varying the speed of the blower fan 32 of the first cooling system 30 and of the pump 41 of the second cooling system 40, or controlling drive and stop.

In the embodiment described above, the electrical storage apparatus 1 includes the battery replacement determiner 23 that determines whether a replaced new battery module is a new battery module 10a. The electrical storage apparatus 1 may nonetheless include no battery replacement determiner 23. An example of this arrangement will be described.

A newly replaced battery module 10a, once subject to forced cooling for a predetermined period of time, is not subject to forced cooling any more. The forced cooling performed for a predetermined period of time degrades performance of the new battery module 10a to some degree and a second session of forced cooling results in overcooling to thereby degrade performance.

The controller 20 thus includes a status flag for each battery module 10 and sets 1 in the status flag for a battery module 10a that has been subject to one session of forced cooling. When the replaced battery module 10a is old and is to be replaced with a new one, a switch member is operated to reset the status flag. A cooling program is programmed such that the forced cooling is to be performed when the status flag is "0" and not to be performed when the status flag is "1". A replaced new battery module 10a can thereby be prevented from being overcooled even without having the battery replacement determiner 23.

Nonetheless, the electrical storage apparatus 1 including the battery replacement determiner 23 in the embodiment described above achieves an effect of improving reliability, since failure to perform a resetting operation using a switch can be eliminated.

It is noted that the above embodiment has been described that, in normal cooling, each battery module 10 is cooled only by the cooling passage A and not by the cooling passage B. Nonetheless, under normal conditions, each battery module 10 may be cooled by the cooling passage B, specifically, by slightly opening each open/close valve 46B. The point is that, in the normal cooling, a combined cooling effect achieved by the coolant circulating through the open/close valve 46A and the open/close valve 46B needs to be equal to a required cooling effect and, in the forced cooling, the open/close valve 46B needs to be opened to an angle at which the cooling effect required for the forced cooling can be achieved.

Second Embodiment

Figure 7:
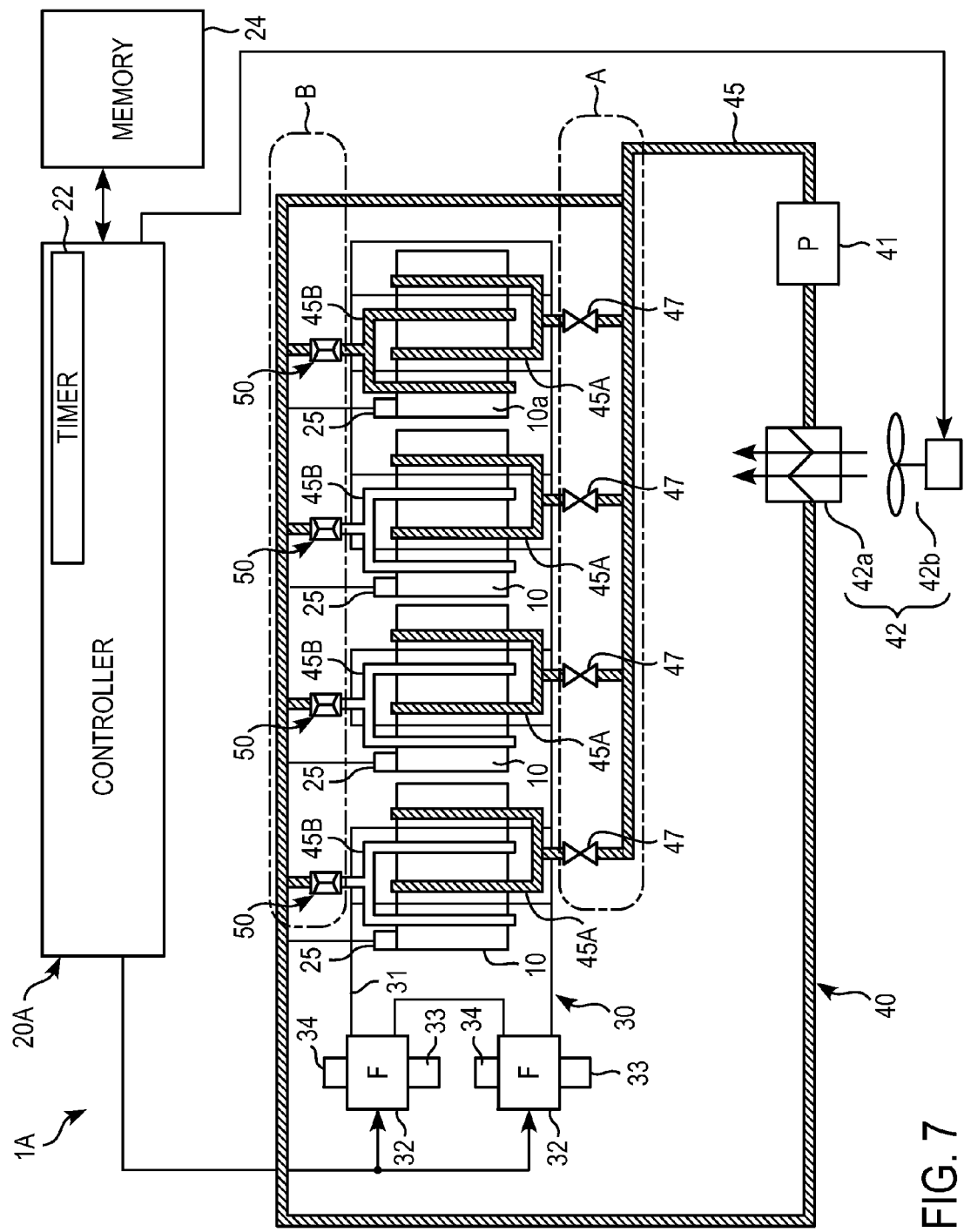
FIG. 7 is a configuration diagram showing a concept of an electrical storage apparatus according to a second embodiment of the present invention.

FIG. 7 shows an electrical storage apparatus according to a second embodiment of the present invention.

An electrical storage apparatus 1A according to the second embodiment differs from the electrical storage apparatus 1 according to the first embodiment in the following points.

(1) The electrical storage apparatus 1A does not include the open/close valve 46B and the actuator 21B; in place of the open/close valve 46B and the actuator 21B, the electrical storage apparatus 1A includes an open/close mechanism 50.

(2) The electrical storage apparatus 1A does not include the open/close valve 46A and the actuator 21A; in place of the open/close valve 46A and the actuator 21A, the electrical storage apparatus 1A includes a manual open/close valve 47.

(3) A controller 20A does not include the battery replacement determiner 23 and includes only a timer 22.

The electrical storage apparatus 1A according to the second embodiment will be described below.

Arrangements other than above are similar to those of the first embodiment. Like or corresponding parts are identified by the same reference numerals and descriptions for those parts will not be duplicated.

FIGS. 8(A) to 8(C) are cross-sectional views for illustrating structures and operation of the open/close mechanism 50.

The open/close mechanism 50 includes a box-shaped case 51 and a pair of open/close members 52 housed in the case 51. The open/close mechanism 50 further includes a pressure member 53, a spring 54, and a solenoid 55. The pressure member 53, the spring 54, and the solenoid 55 are disposed on both sides across the case 51 as a center.

The case 51 is formed of metal or any other material having good thermal conductivity. The case 51 is attached tightly to a surface of the battery module 10, though not shown. Instead, an outer case housing the battery module 10 may have a thermally-conductive fin and the case 51 may be in contact with the thermally-conductive fin. The case 51 has openings 51a formed in upper and lower portions thereof. A pipe 45 is connected to each of the openings 51a. The case 51 further has openings 51b formed in a pair of side surfaces thereof that face each other. A pressure portion 53a of the pressure member 53 is passed through each of the openings 51b. The case 51 further includes shoulders 51c disposed on inner surfaces of the upper and lower portions thereof, the shoulders 51c protruding inwardly. The opening 51a that communicates with the pipe 45 is extended through a center of the shoulder 51c.

The pair of open/close members 52 housed in the case 51 is formed of a shape memory alloy. Each of the open/close members 52 has a semi-cylindrical shape at a temperature of a transformation point or below and recovers a substantially flat shape as shown in FIG. 8(B) to be described later at a temperature of or above the transformation point.

Referring to FIG. 8(A), under low temperature conditions, each of the open/close members 52 has a central portion abutted on a central portion of its mating member with peripheral edge portions in tight contact with an inside of the side surface of the case 51. Under this condition, a flow passage of the pipe 45 is closed.

Referring to FIG. 8(B), under high temperature conditions, each of the open/close members 52 changes its shape to a substantially flat shape. Under this condition, the flow passage of the pipe 45 is open.

The pressure member 53 includes the pressure portion 53a that abuts on the central portion of the open/close member 52 and a base portion 53b that is wider than the pressure portion 53a. The spring 54 is a compression spring that urges the base portion 53b of the pressure member 53 toward the side of the open/close member 52 at all times. The solenoid 55 includes a plunger 55a that protrudes to abut on a front surface of the base portion 53b of the pressure member 53 at all times. Specifically, the plunger 55a of the solenoid 55 restricts movement of the pressure member 53 that is urged by the spring 54 toward the side of the open/close member 52.

Therefore, when the solenoid 55 is energized so that the plunger 55a retracts, the pressure member 53 is moved toward the side of the open/close member 52 by an urging force of the spring 54. The pressure portion 53a of the pressure member 53 passes through the opening 51b in the case 51 to thereby press a substantially central portion of the open/close member 52. The pressure portion 53a of the pressure member 53 has a pressing force that is greater than a recovery force of the open/close member 52 to recover an original shape thereof. The open/close member 52 is thus deformed even with a temperature transmitted to the open/close member 52 being equal to, or higher than, the transformation point. The peripheral edge portions of the open/close member 52 abut on peripheral edge portions of the shoulders 51c and are thus restricted from being deformed. As a result, when the solenoid 55 is energized and the pressure portion 53a of the pressure member 53 presses the central portion of the open/close member 52 with the urging force of the spring 54, the central portion of the open/close member 52 is bent inwardly, so that the flow passage of the pipe 45 is closed, as shown in FIG. 8(C).

A cooling operation for the battery module according to the second embodiment will be described below.

In a condition in which none of the battery modules 10 of the electrical storage apparatus 1A is replaced, all of the open/close mechanisms 50 are in a condition in which a cooling passage B is closed as shown in FIG. 8(C). The open/close valve 47 connected to a cooling passage A is manually adjusted to an appropriate opening. Under this condition, all battery modules 10 are cooled by cooling air circulating through a pipe 31 of a first cooling system 30 and coolant circulating through the cooling passage A of a second cooling system 40.

When the battery module 10 on the right end reaches its service limit and is thus removed and replaced with a new battery module 10a. When the new battery module 10a is mounted, the pressure member 53 is returned from the position shown in FIG. 8(C) in a direction of compressing the spring 54 to thereby cause the plunger 55a of the solenoid 55 to abut on the front surface of the base portion 53b of the pressure member 53. This brings the open/close mechanism 50 mounted on the new battery module 10a into a position as shown in FIG. 8(A).

When a predetermined period of time elapses after constant current charging has been started under the above condition, only the temperature of the new battery module 10a reaches the transformation point of the open/close member 52 or more. As a result, the open/close member 52 of the open/close mechanism 50 mounted on the new battery module 10a is formed into a substantially flat shape shown in FIG. 8(B). The new battery module 10a is therefore cooled also by coolant that circulates through the cooling passage B of the second cooling system 40. The temperature of the battery module 10 yet to be replaced with a new one still falls short of the transformation point and the condition in which the flow passage is closed shown in FIG. 8(A) is maintained.

The open/close mechanism 50 shown in FIG. 7 represents the above charging condition.

Specifically, only the new battery module 10a is subject to forced cooling, while the battery modules 10 yet to be replaced with new ones are subject to normal cooling. This prevents thermal degradation of the new battery module 10a from being accelerated and eliminates likelihood that performance of the battery modules 10 yet to be replaced with new ones will be degraded by overcooling.

After a lapse of a predetermined period of time after the start of charging, the controller 20A transmits a drive signal to the solenoid 55 to thereby retract the plunger 55a. The plunger 55a that restricts the movement of the pressure member 53 that is urged by the spring 54 is then displaced. This causes each pressure portion 53a of the pair of pressure members 53 to press the substantially central portion of the open/close members 52 that have recovered their original shapes, thus establishing a condition shown in FIG. 8(C). As a result, the cooling passage B is closed and the replaced new battery module 10a is also subject to the normal cooling as with the battery modules 10 yet to be replaced with new ones.

As described earlier with reference to the first embodiment, an old battery module 10 after a long time of use has an increased internal resistance and its temperature may become high as in the new battery module 10a during charging and discharging. In the second embodiment, however, once the open/close mechanism 50 is placed in the condition shown in FIG. 8(C) after a new battery module 10a has been mounted and charged, the cooling passage will never thereafter open unless the pressure member 53 is manually returned to a retracted position. Old battery modules are not therefore likely to be overcooled.

The electrical storage apparatus 1A according to the second embodiment achieves the following effects.

(1) Only the new battery module 10a that has been newly installed to replace an old battery module 10 is subject to forced cooling with intensity greater than that for the battery module 10 yet to be replaced with a new one. The new battery module 10a can therefore be prevented from being deteriorated and performance of the battery module 10 yet to be replaced with a new one can be maintained.

(2) After the new battery module 10a has been subject to forced cooling for a predetermined period of time, the pressure member 53 deforms the open/close members 52 to thereby close the flow passage for forced cooling. This condition is maintained until the pressure member 53 is manually returned to its retracted position. Force cooling is therefore not performed even when the temperature of the battery module 10 yet to be replaced with a new one increases, so that performance of the battery module 10 yet to be replaced with a new one is not reduced.

(3) Normal cooling is resumed after forced cooling for a predetermined period of time of the new battery module 10a. This eliminates possibility of the new battery module 10a being excessively cooled, so that performance of the new battery module 10a is prevented from being degraded due to overcooling.

The effects of (1) to (3) described above correspond to those of the first embodiment. Note, however, that, while being achieved in the first embodiment through control by the controller 20, the effect of (2) is achieved in the second embodiment through operation performed by an operator. Still, the first embodiment includes the open/close valves 46A, 46B that are opened or closed by the control of the controller 20, which makes the apparatus cost high. In contrast, the apparatus in the second embodiment does not require such costly open/close valves 46A, 46B, which lowers the cost of the apparatus.

In the description given above, the cooling passage is closed by the open/close members 52 in the conditions shown in FIGS. 8(A) and 8(C). Nonetheless, the cooling passage may not necessarily be fully closed when the open/close members 52 are deformed into semi-cylindrical shapes, so that a slight amount of coolant may flow through the cooling passage.

The point is that, in the normal cooling, a combined cooling effect achieved by the coolant circulating through the open/close valve 47 and the open/close mechanism 50 needs to be equal to a required cooling effect and, in the forced cooling, the cooling effect required for the forced cooling has only to be achieved with the open/close mechanism 50 open as shown in FIG. 8(B).

Third Embodiment

Figure 9:
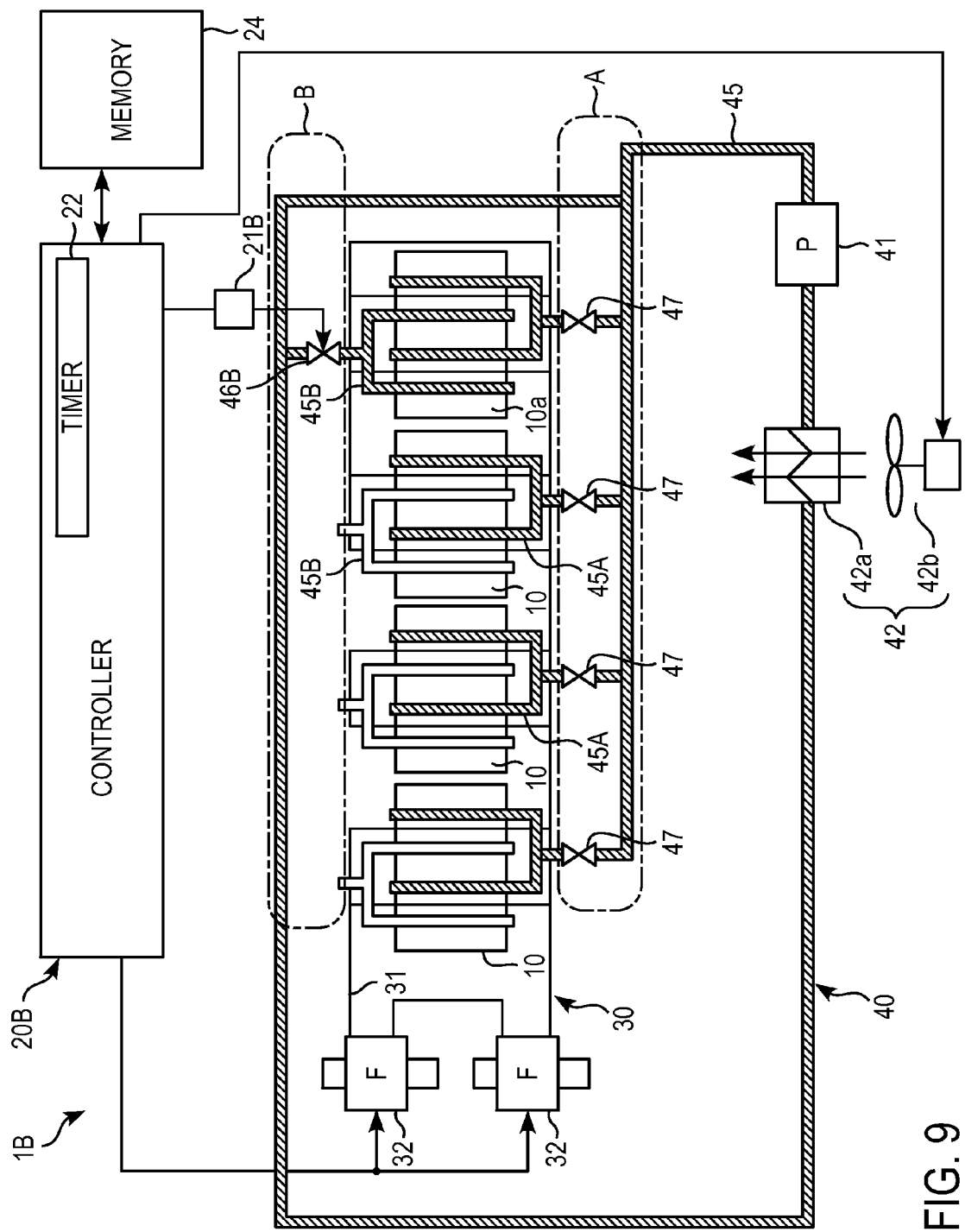
FIG. 9 is a configuration diagram showing a concept of an electrical storage apparatus according to a third embodiment of the present invention.

FIG. 9 shows an electrical storage apparatus according to a third embodiment of the present invention.

An electrical storage apparatus 1B according to the third embodiment differs from the electrical storage apparatus 1 according to the first embodiment in the following points.

(1) The electrical storage apparatus 1B includes an open/close valve 46B and an actuator 21B only for one electrical storage module. No open/close valves, whether they be electrically or manually driven, are provided for all other electrical storage modules.

(2) The electrical storage apparatus 1B does not include the open/close valve 46A or the actuator 21A and, instead, includes a manual open/close valve 47.

(3) A controller 20A does not include the battery replacement determiner 23 and includes only a timer 22.

(4) Each battery module 10 does not have a temperature sensor for detecting the temperature of the battery module 10.

Regardless of which one of the battery modules 10 is old to be replaced with a new one, the electrical storage apparatus 1B according to the third embodiment requires that the new battery module be mounted at one specific position, specifically, at the position at which the open/close valve 46B is disposed.

Control and operation of the electrical storage apparatus 1B according to the third embodiment will be described below.

In a condition in which none of the battery modules 10 of the electrical storage apparatus 1B is replaced, all battery modules 10 are cooled by cooling air circulating through a pipe 31 of a first cooling system 30 and coolant circulating through a cooling passage A of a second cooling system 40. In this case, a pipe 45B is integrated with each battery module 10.

Assume, for example, that the battery module 10 disposed at the second position from the left end has degraded performance and requires replacement with a new battery module 10a.

The battery module 10 disposed at the second position from the left end is first removed from the electrical storage apparatus 1B. Then, the battery module 10 disposed at the position at which the open/close valve 46B is disposed, specifically, the right end position is removed and relocated at the position at which the removed battery module 10 was disposed, specifically, at the second position from the left end. Thereafter, a new battery module 10a is mounted at the right end position. The battery module 10a is integrated with the pipe 45B and, when the new battery module 10a is mounted, inlet and outlet ports of the pipe 45B are aligned with the open/close valve 46B.

As described above, the battery module 10 disposed at the position provided with the open/close valve 46B is relocated to a position from which a battery module 10 requiring replacement has been removed and a new battery module 10a is mounted at the position provided with the open/close valve 46B at all times.

When charging is to be started, the controller 20B issues a command to the actuator 21B to thereby open the open/close valve 46B. This allows only the replaced new battery module 10a to be subject to forced cooling. The electrical storage apparatus 1B shown in FIG. 9 illustrates open/close positions of the open/close valves during the charging. After a lapse of a predetermined period of time after the start of the charging, the controller 20B closes the open/close valve 46B via the actuator 25B. This eliminates likelihood that the new battery module 10a will be overcooled after the charging.

FIG. 10 shows open/close positions of the open/close valves of the electrical storage apparatus 1B according to the third embodiment. In FIG. 10, the "open" position of the cooling passage A is achieved manually.

In the third embodiment, too, similar effects to the effects of (1) to (3) in the first embodiment can be achieved.

It is to be noted that the open/close valve 46B in the third embodiment may be replaced by the open/close mechanism 50 that includes the open/close members 52 formed of a shape memory alloy of the second embodiment.

Additionally, the open/close valve 47 may be replaced by an electrically driven open/close valve similar to the open/close valve 46B. In this case, the controller 20B may include the battery replacement determiner 23 described in the first embodiment.

In the third embodiment, a roller or sliding member may be disposed on a floor surface and the battery module 10 may be mounted thereon. This allows the battery modules 10 to be moved easily when a battery module 10 is to be replaced with a new one.

Figure 11:
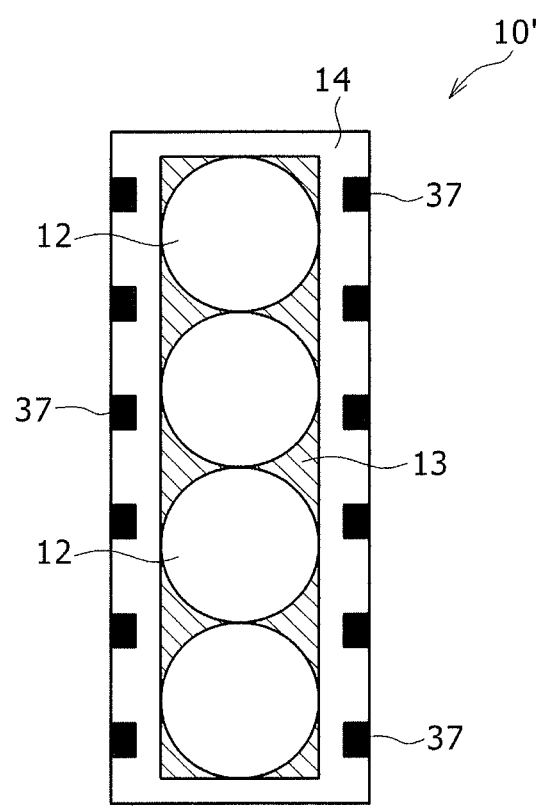
FIG. 11 is a cross-sectional view showing a battery structure according to a further embodiment of the present invention.

FIG. 11 is a cross-sectional view showing a battery module according to a modified example.

The battery module 10 shown in FIG. 2 includes a plurality of flat-shaped secondary battery elements 11. In contrast, a battery module 10' shown in FIG. 11 includes a plurality of the cylindrical secondary battery elements 12 housed in a case member 14. The cylindrical secondary battery elements 12 each are configured, though not shown, such that a positive electrode and a negative electrode are laminated with each other with a separator inserted therebetween and wound around an axial center to form a cylinder, the positive electrode being a positive electrode sheet having both surfaces coated with a positive electrode active material and the negative electrode being a negative electrode sheet having both surfaces coated with a negative electrode active material. A space between each cylindrical secondary battery element 12 and the case member 14 is filled with a heat transfer promoter 13.

The heat transfer promoter 13 promotes thermal conduction between the cylindrical secondary battery element 12 and the case member 14 during charging and discharging. The heat transfer promoter 13 is formed of a gel or liquid material.

In addition, the case member 14 of the battery module 10' has a cooling passage 37 formed in a surface thereof, the cooling passage 37 assuming a flow passage of the coolant. The above-described pipe 31 or 45 is connected to the cooling passage 37.

In each of the above-described embodiments, each battery module is cooled via the pipe in contact with the surface of each battery module. A structure incorporating no piping may still be possible for the cooling passage that cools the battery module. For example, a space through which coolant circulates may be defined between an apparatus main unit that houses therein a plurality of battery modules and each of the battery modules, thus making the space serve as the cooling passage.

In each of the above-described embodiments, the cooling passage is formed in units of the battery module 10 that includes a plurality of secondary battery elements 11. The cooling passage may nonetheless be formed in units of a single secondary battery element 11. In this case, referring to FIG. 2, each of the pipes 31, 45A, 45B may be disposed between the secondary battery elements 11 that constitute the battery module 10. Alternatively, the secondary battery elements 11 may be disposed independently, instead of constituting the battery module 10, and the pipes 31, 45A, 45B may be disposed so as to be in contact with the surface of each of the secondary battery elements 11.

Additionally, the lithium-ion battery cell is not the only possible choice for the secondary battery elements 11 constituting the battery module. Other types of secondary battery elements may still be used, such as a nickel-metal hydride battery and a nickel-cadmium battery.

The electrical storage apparatus of the present invention can be configured with variations and modifications effected within the spirit and scope of the invention. The point is that the electrical storage apparatus preferably comprises: a plurality of battery structures, each including at least one secondary battery element; a first cooling passage for cooling each of the battery structures; a second cooling passage for cooling at least one of the battery structures; and means for supplying coolant to each of the battery structures via the first cooling passage and, within a predetermined period of time after replacement of the battery structure, supplying coolant to the battery structure via the second cooling passage.

DESCRIPTION OF REFERENCE NUMERALS

1: Electrical storage apparatus
10, 10': Battery module
10a: New battery module
11: Secondary battery element
20, 20A, 20B: controller
30: First cooling system
40: Second cooling system
46A, 46B: Open/close valve
50: Open/close mechanism

The invention claimed is:

1. An electrical storage apparatus comprising:
   a plurality of battery structures, each including a plurality of secondary battery elements;
   a first cooling passage for cooling all of the plurality of battery structures; and
   a second cooling passage, separate from the first cooling passage, for cooling one of the plurality of battery structures that has been replaced;
   wherein the electrical storage apparatus is configured to supply coolant to all of the plurality of battery structures via the first cooling passage and, within a first period of time after replacement of one of the plurality of battery structures with a replacement battery structure, the coolant is supplied, only via the second cooling passage, to only the replacement battery structure.

2. The electrical storage apparatus according to claim 1, further comprising:
   a housing in which all of the battery structures are disposed, wherein
   the battery structure to which the coolant is supplied via the second cooling passage is disposed at a position of the housing.

3. The electrical storage apparatus according to claim 1, wherein the secondary battery element comprises a lithium-ion secondary battery cell.

4. The electrical storage apparatus according to claim 1, further comprising:
   a temperature sensor for detecting a temperature of each of the plurality of battery structures; and
   a controller programmed to determine whether one of the plurality of battery structures is the replacement battery structure based on a change in temperature of each of the plurality of battery structures, the temperature being detected at time intervals.

5. The electrical storage apparatus according to claim 4, further comprising:
   a storage unit for storing a temperature change characteristic of the replacement battery structure;
   wherein the controller is further programmed to
      calculate a temperature change characteristic of each battery structure; and
      determine the replacement battery structure by comparing the temperature change characteristic stored in the storage unit with a calculated temperature change characteristic.

6. The electrical storage apparatus according to claim 5, further comprising:
   an open/close valve for opening or closing at least a flow passage of the second cooling passage;
   wherein the controller is programmed to control opening and closing of the open/close valve.

7. The electrical storage apparatus according to claim 6, wherein
   the open/close valve closes the flow passage of the second cooling passage after the battery structure has been supplied with the coolant via the second cooling passage for a second period of time.

* * * * *